United States Patent

Withington et al.

[11] Patent Number: 5,714,236
[45] Date of Patent: Feb. 3, 1998

[54] DECORATIVE METHOD AND MATERIAL

[75] Inventors: Steven Charles Withington; Sally-Anne Alsop; Philip Robert Jackson, all of Stoke-on-Trent, United Kingdom

[73] Assignee: British Ceramic Research Limited, Staffordshire, England

[21] Appl. No.: 750,301

[22] PCT Filed: Jun. 9, 1995

[86] PCT No.: PCT/GB95/01358

§ 371 Date: Dec. 5, 1996

§ 102(e) Date: Dec. 5, 1996

[87] PCT Pub. No.: WO95/34520

PCT Pub. Date: Dec. 21, 1995

[30] Foreign Application Priority Data

Jun. 14, 1994 [GB] United Kingdom ............ 9411857

[51] Int. Cl.$^6$ ....................................... B32B 9/00
[52] U.S. Cl. ............ 428/195; 428/207; 428/209; 428/210; 428/325; 428/384; 428/402; 428/432; 428/433; 428/457; 428/697; 428/702; 423/594; 423/607; 423/632; 427/126.6; 427/226; 427/266; 156/89; 156/230; 106/20; 106/429
[58] Field of Search ............... 428/210, 325, 428/402, 195, 331, 209, 457, 207, 38, 426, 432, 702, 433, 384, 697; 423/639, 595, 594, 632, 607; 427/126.6, 226, 229, 266; 106/429, 447, 20, 441; 156/89, 230, 384

[56] References Cited

U.S. PATENT DOCUMENTS

| 3,994,727 | 11/1976 | Polichette et al. | 96/38.4 |
|---|---|---|---|
| 4,880,772 | 11/1989 | Pederson et al. | 505/1 |
| 4,894,092 | 1/1990 | Nishihara et al. | 106/452 |
| 4,959,247 | 9/1990 | Moser et al. | 427/126.5 |
| 5,034,244 | 7/1991 | Berrer et al. | 427/54.1 |
| 5,091,003 | 2/1992 | Boaz | 106/20 |
| 5,114,702 | 5/1992 | Pederson et al. | 423/639 |
| 5,273,575 | 12/1993 | de Saint Romain | 106/23 |
| 5,407,474 | 4/1995 | Airey et al. | 106/20 |
| 5,541,265 | 7/1996 | Gomi et al. | 525/366 |

FOREIGN PATENT DOCUMENTS

| 0 402 946 | 12/1990 | European Pat. Off. |
| 0 515 284 A1 | 11/1992 | European Pat. Off. |
| 0 572 314 A1 | 12/1993 | European Pat. Off. |
| 2 624 852 | 6/1989 | France. |
| 2 213 919 | 8/1989 | United Kingdom. |
| WOA89 12027 | 12/1989 | WIPO. |

*Primary Examiner*—Patrick Ryan
*Assistant Examiner*—Abraham Bahta
*Attorney, Agent, or Firm*—Adams Law Firm, P.A.

[57] ABSTRACT

A method of decorating a firable article which includes the step of mixing a metallic salt with a fuel material which can supply oxygen to the salt in a reaction. This mixture causes complex formation of the salt, characterized by raising the pH of the mixture to at least 5. Additives in the mixture promote stability and provide the required viscosity surface tension and conductivity for use in an ink jet printer. When applying a solution of this mixture onto a firable article by ink jet printing, the mixture is such that upon drying, the mixture reacts to form an oxide of the metal to provide a decorative color pigment on the article.

22 Claims, No Drawings

DECORATIVE METHOD AND MATERIAL

This application is a national stage application, according to Chapter II of the Patent Cooperation Treaty. This application claims the priority date of Jun. 14, 1994, U.K. Patent No. 9411857.7.

This invention concerns a method of decorating firable articles and particularly but not exclusively ceramic articles; and a material usable in such a method.

BACKGROUND OF THE INVENTION

Conventionally the majority of firable inks used for decorating ceramic articles and other firable materials have contained pigments held in suspension. The pigments provide heat stable colours with sufficient colour intensity for decorating for example tableware. It has become appreciated that when decorating such articles considerable advantages can be provided by non-contact printing, and especially using ink jet printing. However, difficulties have been encountered in providing suspended pigment inks which can be used in ink jet printers, especially over a wide range of colours. Inks have also been used comprising a soluble metallic salt which provides a required colour by oxide formation and/or reacting with the decorated article upon firing. Problems have though again been encountered with such inks and particularly with providing inks usable with ink jet printers with a required colour intensity for a wide range of colours.

SUMMARY OF THE INVENTION

According to the present invention there is provided a method of decorating a firable article, the method comprising mixing a metallic salt with a fuel material which can supply oxygen to the salt in a reaction, and applying a solution of this mixture onto a ceramic article, the mixture being such that upon drying the mixture reacts to form an oxide of the metal to provide a decorative colour on the article.

DESCRIPTION OF THE PREFERRED EMBODIMENT

The mixture is preferably such that the metal oxide formed after application onto the article has a very small particle size, and the particles may be nano sized.

The mixture is preferably such that the reaction only occurs upon heat being applied to the article. The heat may be applied during firing of the article, or prior thereto.

The mixture is preferably applied on to the article by ink jet printing.

The fuel material preferably increases the solubility of the metallic salt, and the solubility may be increased by virtue of complex formation.

The invention also provides a decorative material comprising a mixture usable in a method according to any of the preceding five paragraphs.

The fuel material preferably comprises an amino acid and may comprise glycine. Alternatively, the fuel material may comprise urea or acetonyl acetone.

The material may comprise a mixture of salts, and the salts may comprise any of nitrates, citrates, oxalates or acetates.

In one arrangement the metal colourant ions are complexed using a citric acid and ethylene glycol mixture.

The salt or salts are preferably in solution, and an aqueous solution may be used. Alternatively alcohol may be used as a solvent.

The material may comprise soluble precursors to produce a flux. The precursors may comprise any of borax, a boron salt, an aqueous silicate, or a phosphate.

The material may include additives including a gum, a semi-permanent binder, and/or finely divided colloidal material such as silica sols or fumed silica.

The material may comprise a base such as aqueous ammonia.

Modifying additives may be provided in the material to provide any of the required viscosity, surface tension or conductivity for ink jet printing.

An embodiment of the present invention will now be described by way of example only.

A decorative material according to the invention for application by an ink jet printer onto a ceramic material was formed from the following constituents.

| | |
|---|---|
| Cobalt Nitrate | 29.1 g |
| Chromium Nitrate | 40.0 g |
| Manganese Nitrate | 28.7 g |
| Iron Nitrate | 40.4 g |
| Glycine | 60.0 g |

These constituents were added to 40 ml of ionised water. 50 ml of concentrated ammonia solution was added to raise the pH above 5, and the mixture was then diluted to a volume of 215 cm$^3$.

The resultant material was printed onto a ceramic article using an ink jet printer such that the material dried very quickly following printing. The printed article was then placed in an oven prior to conventional firing. In the oven the glycine reacted with the nitrates to form a black mixture of the respective oxides. This mixture was in the form of very fine nano size particles. The very fine particle size provides a high surface area which thus provides a required colour intensity. As a result of this small particle size, the pigments are known as High Surface Area Pigments, HSAP. The glycine ligand acts as a fuel and upon heating is oxidised by the nitrate. The metal nitrate solution once glycine has been added, will contain metal—glycine complexes. This mixture is characterised by its forming soluble gums when concentrated, and so prevents preferential crystallisation of any particular one of the metals from solution. This leads to formations of an intimately mixed and homogeneous metal oxide pigment in the ensuring reaction.

Many variations may be made in addition or as an alternative to the described example. In this example aqueous solutions are used, but where required alcoholic solutions could be used. In the described example cold ware is printed and then subsequently warmed. As an alternative, the ink jet printer could print on to warm ware such that the oxidising reaction takes place almost instantly.

The ratio of the four metal salts in the material may be altered to provide a preferred shade of black pigment. A wide variety of metal salts may be used to provide different coloured pigments or crystal types. The mixture of salts can be varied to form different crystal lattice structures such as spinels, sphenes, or zircones.

Salts other than nitrates could be used, such as citrates, oxalates, or acetates. For instance, a system based on the Pechini method (or variations thereof) can be used where the metal colourant ion or ions can be complexed using a citric acid/ethylene glycol mixture.

A fuel material other than the glycine may be used. For example, other amino acids may be used, as could urea or acetonyl acetone. A base other than ammonia could be used to raise the pH of the material.

As well as pigment precursors, the material may contain soluble precursors for forming a flux material. These precursors may comprise borax, a boron salt, an aqueous silicate, a phosphate, or any other material which may yield a glassy phase to allow the pigment to bond to the glaze substrate and produce a decorative, wear and detergent resistant finish.

In the material according to the invention the nitrates act as an oxidant and the glycine as a fuel. The oxidant-fuel ratio may be varied to provide the most satisfactory results with regard to stability of the print during firing. It is required to avoid disruptive ignition of the print area which would blur the final print design.

The material may include other additions such as gums or semi-permanent binders to promote stability of the material. Additives may also be provided to modify the material to provide the required viscosity, surface tension or conductivity for use in an ink jet printer.

The material may further include additives such as finely divided colloidal material e.g. silica sols or fumed silica. Such additives can form a glass system or aid the development of certain crystal lattice structures.

Whilst the above described example uses an ink jet printer, other printing or decorative methods may be possible. This method can be used to decorate ceramic articles, glass or other firable materials.

The invention therefore provides a method of decoration and material usable in this method which provides a good colour intensity as a result of the large surface area of pigment on the decorated article. As the pigment is formed subsequent to printing, decoration methods such as ink jet printing can readily be used with the advantages such methods provide.

Whilst endeavouring in the foregoing specification to draw attention to those features of the invention believed to be of particular importance it should be understood that the Applicant claims protection in respect of any patentable feature or combination of features hereinbefore referred to and/or shown in the drawings whether or not particular emphasis has been placed thereon.

We claim:

1. A method of decorating a firable article, the method comprising the steps of:

mixing a metallic salt with a fuel material for supplying oxygen to the salt in a reaction and which causes complex formation of the salt, raising the pH of the mixture to at least 5, including additives in the mixture to promote stability and provide the required viscosity surface tension and conductivity for use in an ink jet printer, and applying a solution of this mixture onto a firable article by ink jet printing, the mixture being such that upon drying the mixture reacts to form an oxide of the metal to provide a decorative color pigment on the article.

2. A method according to claim 1, wherein the mixture is such that particles of the metal oxide formed after application onto the article are nano sized.

3. A method according to claim 1 wherein the mixture is such that the reaction only occurs upon heat being applied to the article.

4. A method according to claim 3, wherein the heat is applied during firing of the article.

5. A method according to claim 3, wherein the heat is applied prior to firing of the article.

6. A method according to claim 1, wherein the fuel material increases the solubility of the metallic salt.

7. A method according to claim 6, wherein the solubility is increased by virtue of complex formation.

8. A decorative material wherein it comprises a mixture usable in a method according to claim 1.

9. A material according to claim 8, wherein the fuel material comprises an amino acid.

10. A material according to claim 9, wherein the fuel material comprises glycine.

11. A material according to claim 8, wherein the fuel material comprises urea or acetonyl acetone.

12. A material according to claim 8, wherein the material comprises a mixture of salts.

13. A material according to claim 12, wherein the salts comprise any of nitrates, citrates, oxalates or acetates.

14. A material according to claim 13, wherein the salts are provided in a citric acid and ethylene glycol mixture which causes complexing of the metal colourant ions.

15. A material according to claim 12, wherein the salt or salts are in solution.

16. A material according to claim 15, wherein an aqueous solution is used.

17. A material according to claim 15, wherein alcohol is used as a solvent.

18. A material according to claim 8, wherein the material comprises soluble precursors to produce a flux.

19. A material according to claim 18, wherein the precursors comprise any of borax, a boron salt, an aqueous silicate, or a phosphate.

20. A material according to claim 18, wherein the additives comprise any of a gum, a semi-permanent binder, and/or finely divided colloidal material such as silica sols or fumed silica.

21. A material according to claim 8, wherein the material comprises a base.

22. A material according to claim 21, wherein the base is aqueous ammonia.

* * * * *